Patented Oct. 6, 1942

2,297,904

UNITED STATES PATENT OFFICE 2,297,904

PROPAGATION

John Frank Lontz, Wilmington, Del., assignor to E. I. du Pont de Nemours & Company, Wilmington, Del., a corporation of Delaware No Drawing. Application October 4, 1940, Serial No. 359,799

12 Claims. (Cl. 47—58)

This invention relates to plant growth stimulants.

Recently a number of chemical compounds sometimes referred to as synthetic plant hormones, have been found to have a profound effect on plant development in its various aspects. These synthetic plant hormones have been shown to affect plant development in such ways as aiding and accelerating the germination of seeds, inducing new root formation on cuttings normally difficult to root as well as accelerating root developing, improving the general growth of plants, and preventing premature dropping of fruit.

While many of the individual products are effective as plant or root growth stimulants in very small concentrations when applied to intact plants, cuttings, and seeds it has nevertheless been observed that the concentration/time factor is very critical. Unfortunately, when this factor is exceeded by using either a higher concentration or longer treating time, the stimulating effects no longer appear and instead considerable injury to the plant develops, as evidenced by twisting, stunting and even severe burning of stems and leaves. Thus, these synthetic plant hormones can be very toxic to plants despite their high order of activity and a considerable amount of care must be exercised in applying them to plants and in many instances numerous trials must be made in order to determine the optimum, and at the same time non-toxic, concentration for use with a given plant or even variety of a plant. This is a disadvantage especially when the plant growth stimulant is to be used by persons unable to devote time to determining the narrow range wherein beneficial results are obtained without injury to plants.

This invention has as an object the provision of a new class of plant stimulants. A further object is the provision of chemical compounds useful in the control of plant development, e. g., inducing development of new roots on cuttings and intact plants, accelerating the germination of seeds and preventing the premature dropping of fruit. Another object is the provision of such compounds having a lower order of toxicity to plants than that of compounds hitherto used. Another object is the provision of plant stimulants having a greater margin of safety for use with the plants. Other objects will appear hereinafter.

These objects are accomplished by the following invention of, as a means for the control of plant development, a dihydro polynuclear aromatic compound having the two additional hydrogens on a ring to which there are attached, by single bonds, two carbons all of whose remaining valences are satisfied through polyvalent inorganic negative elements of the first full period of the periodic system, i. e., through elements of atomic weights of 14 to 16, i. e., through oxygen and nitrogen and the invention is generic thereto. A particularly preferred class coming within the scope of the invention is that of dihydro polynuclear aromatic compounds containing, attached to the alicyclic ring two carboxyl groups and salts, esters, nitriles, and amides of these acids. The acids may also be described as cyclohexadienedicarboxylic acids having two adjacent carbon atoms of the cyclohexadiene ring forming part of an aromatic, preferably hydrocarbon, ring.

The compounds of this invention have been found to be considerably less toxic than the compounds hitherto discovered. Their general utility as plant growth stimulants is disclosed below. When applied in lanolin paste in concentrations varying from 0.5 to 5.0 per cent to the more succulent types of plants, such as the tomato, the acids of this invention and their salts, amides, nitriles, and esters induce the same responses as observed with the naturally occurring growth substances such as 3-indoleacetic acid, namely, bending of the stem and twisting of the leaves.

The more detailed practice of the invention is illustrated in the following examples. There are of course many forms of the invention other than these specific embodiments.

Example I

This example illustrates the hormone-like activity of the compounds of this invention as well as the advantage of lower toxicity as compared to a synthetic hormone such as alpha-naphthylacetic acid.

Two-weeks old tomato seedlings are potted individually and grouped in threes for triplicate tests. One series (A) is treated with a 1% lanolin paste of 1,4-dihydronaphthalene-1,4-dicarboxylic acid applied to the stem, just at and below the highest branch or internode, by means of a glass rod, another (B) is similarly treated with 1% lanolin paste of alpha-naphthylacetic acid, and a third (C) is left untreated for purposes of control. Within 4–8 hours series B shows definite signs of twisting and bending while series A shows slight bending after 12 hours. No change is noted in series C. A few days later, series B shows signs of injury and the plants are definitely stunted while in series A most of the plant seems to recover from the preliminary effects. Within 14 to 21 days plants in series A have a number of roots emerging at the site of application while in series B a considerable amount of callous tissue has developed due to the injurious effect of alpha-naphthylacetic acid, at the same time the plants are definitely stunted and twisted. Other than the appearance of roots on series A, the plants of both series A and C are practically identical in appearance.

In the customary practice of propagating plants from cuttings, it is preferable to treat the cuttings either with talc or clay dust preparations or by immersing in aqueous solutions or suspensions of the compounds of this invention, e. g., 1,4-dihydronaphthalene-1,4-dicarboxylic acid, and its derivatives. In the former instance the basal ends of the cuttings are simply dipped into the dust and then placed in clean sand or soil which is watered occasionally. Depending upon the variety of plant cutting the appearance of vigorous roots may be accelerated from about 2 to 6 or more weeks. This treatment also makes it possible to root cuttings which will not root at all or will do so under very special conditions. The dust concentration may vary from 0.5 to 10 per cent depending upon the plants used, generally, the most easily rooted the plant the lower the necessary concentration, and vice versa.

In applying the aqueous solution treatment the effective concentration is considerably lower than that used with dust preparations. In this case the basal ends are placed in a solution containing from 3–200 mgms. per liter of solution (normally 60 mgm. being sufficient) depending upon the length of treatment and also upon the ease with which a given cutting is rooted.

The following Example II illustrates the method of immersing the basal ends in aqueous solutions using three series of geranium and carnation cuttings.

Example II

One series (A) of cuttings is soaked for 4 hours at room temperature with an aqueous solution containing 54 mgms. per liter of 1,4-dihydronaphthalene-1,4-dicarboxylic acid neutralized with sodium carbonate, another series (B) is similarly treated with an aqueous solution containing 27 mgms. per liter of alpha-naphthylacetic acid neutralized with sodium carbonate, while a third series (C) is soaked in water only for purposes of control. The cuttings are then placed in clean sand and watered occasionally. After 25 days, it is observed that the group (B) were injured and have rotted as a result of the treatment with alpha-naphthylacetic acid. In series (A), in which the compound of this invention is used, all the cuttings are heavily rooted, while in the control series (C) several cuttings of both plants have no roots and the balance are only slightly rooted. In order to avoid the injurious effect of alpha-naphthylacetic acid it is necessary to lower the concentration of the above soaking solution. Applying the above treatment to Coleus cuttings it is found that 1,4-dihydronaphthalene-1,4-dicarboxylic acid accelerated appreciably the rooting time over untreated cuttings.

Example III

A group of 25 carnation cuttings is soaked for 3½ hours at room temperature with an aqueous-alcoholic solution containing 60 mgms. per liter of 1,2-dihydronaphthalene-1,4-dicarboxylic acid. The cuttings are then placed in clean sand for three weeks, with occasional watering. At the end of this period, all 25 of the cuttings show positive rooting, sixteen showing heavy and nine medium rooting. In a similar group of 25 carnation cuttings not subjected to this treatment, ten cuttings fail to show any rooting and the remaining fifteen show only light rooting.

Example IV

A group of 25 carnation cuttings is soaked for 3½ hours at room temperature with an aqueous-alcoholic solution containing 60 mgms. per liter of 9,10-dihydrophenanthrene-9,10-dicarboxylic acid. The cuttings are then placed in clean sand for three weeks, with occasional watering. At the end of this period, all 25 of the cuttings show positive rooting, sixteen of which showing heavy, five medium, and four light rooting. In a similar group of 25 carnation cuttings not subjected to this treatment, ten cuttings fail to show any rooting and the remaining fifteen show only light rooting.

The rooting responses obtained from tests conducted on groups of twenty-five carnation cuttings by soaking the cuttings for 3½ hours in solutions containing 60 mgms. per liter of 1,4-dihydronaphthalene-1,4-dicarboxylic acid (I), its isomer, 1,2-dihydronaphthalene-1,4-dicarboxylic acid (II),

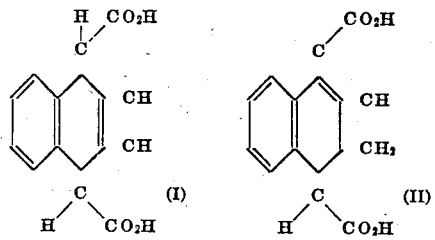

9,10-dihydrophenanthrene-9,10-dicarboxylic acid (III),

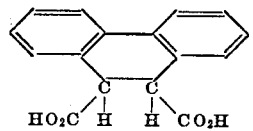

are shown below.

Table I

| Compound | Rooting response | | | |
|---|---|---|---|---|
| | Heavy | Medium | Light | None |
| I | 0 | 16 | 7 | 2 |
| II | 16 | 9 | 0 | 0 |
| III | 16 | 5 | 4 | 0 |
| (Control) | 0 | 0 | 15 | 10 |

This invention is generic to plant stimulants comprising as an essential ingredient a dihydropolynuclear aromatic compound having attached to the alicyclic hydrocarbon ring by single bonds two carbons, the remaining valences of which are satisfied through polynuclear inorganic negative elements of the first full period of the periodic system, i. e., through oxygen or nitrogen. These compounds are cyclohexadiene dicarboxylic acids and derivatives thereof having at least one aromatic hydrocarbon ring fused to the alicyclic ring or derivatives thereof. A preferred subclass is that of the acids and salts, nitriles, amides, and esters thereof. The term "plant"

is used to include young trees, shrubs or herbs, slips, cuttings, and saplings and the present invention is generic thereto, including also seeds which are such in posse.

Certain alicyclic aromatic dicarboxylic acids have been exemplified above but the invention is not limited to these but also includes, for example, 9,10-dihydroanthracene-9,10-dicarboxylic acid, 1,2-dihydronaphthalene-3,4-dicarboxylic acid, 5,6-dihydroquinoline-5,6-dicarboxylic acid, and 1,4-dihydrodibenzofuran-1,4-dicarboxylic acid, as well as the mono- and di-potassium salts, the mono- and dicalcium salts, the mono- and diammonium salts, the mono- and di-(methylammonium) salts, the mono- and di-(isobutylammonium) salts, the mono- and di-(cyclohexylammonium) salts, the hexamethylenediammonium salts, the mono- and diamides, the mono- and didodecylamides, the mono- and diglycine amides, the mono- and dimethyl esters, the mono- and diisobutyl esters, the mono- and dicyclohexyl esters, the mono- and didodecyl esters, the mono- and dibenzyl esters, and the glycol, glycerol and furfuryl esters of these acids and those exemplified above.

The cis and trans isomers may be used. In the case of the salts, while salts of toxic metals such as arsenic, mercury, lead, copper, silver, and thallium may be employed since the quantity useful as a plant stimulant is far below that at which any disadvantage due to toxicity would be of importance, nevertheless salts of alkali metals, alkaline earth metals and ammonium salts are preferred. Esters of lower alkanols, e. g., ethyl, methyl, propyl esters are preferred. Amides wherein the amido hydrogen is unsubstituted or substituted by lower (one to four carbons) alkyl groups are likewise preferred.

The compounds of this invention may be advantageously used for treating seeds for acelerating germination and inducing vigorous growth of plants therefrom, propagating plants by means of cuttings, stimulating plant growth, and preventing premature dropping of fruit, which are included within the scope of the term plant stimulants.

The above description and examples are intended to be illustrative only. Any modification of or variation therefrom which conforms to the spirit of the invention is intended to be included within the scope of the claims.

What is claimed is:

1. A plant development control composition comprising a dihydropolynuclear aromatic compound having the two additional hydrogens on a ring to which there are attached by single bonds two carbons all of whose remaining valences are satisfied through polyvalent negative inorganic elements of the first full period of the periodic system.

2. A plant stimulant comprising a member of the class consisting of polynuclear aromatic dicarboxylic acids having the carboxyl groups attached to a dihydroaromatic hydrocarbon ring, each remaining nucleus being aromatic hydrocarbon, and salts, esters, and amides thereof.

3. A plant stimulant according to claim 2 wherein the acid is a dihydronaphthalene ac dicarboxylic acid.

4. A plant stimulant according to claim 2 wherein the acid is 1,4-dihydronaphthalene-1,4-dicarboxylic acid.

5. A plant stimulant comprising 1,4-dihydronaphthalene-1,2-dicarboxylic acid.

6. A plant stimulant comprising sodium 1,4-dihydronaphthalene-1,4-dicarboxylate.

7. The improvement in propagating plants from cuttings and the like which comprises treating the same with an aqueous solution of a dihydropolynuclear aromatic compound having the two additional hydrogens on a ring to which there are attached by single bonds two carbons all of whose remaining valences are satisfied through polyvalent negative inorganic elements of the first full series of the periodic system.

8. The improvement in propagating plants from cuttings and the like which comprises treating the same with an aqueous solution of a member of the class consisting of polynuclear aromatic dicarboxylic acids having the carboxyl groups attached to a dihydroaromatic hydrocarbon ring, each remaining nucleus being aromatic hydrocarbon and salts, esters, and amides thereof.

9. The improvement in propagating plants from cuttings and the like which comprises treating the same with an aqueous solution of 1,4-dihydronaphthalene-1,2-dicarboxylic acid.

10. The improvement of propagating plants from cuttings and the like which comprises treating the same with an aqueous solution of sodium 1,4-dihydronaphthalene-1,4-dicarboxylate.

11. The improvement in propagating plants from cuttings and the like which comprises treating the same with an aqueous solution of a dihydronaphthalene ac dicarboxylic acid.

12. The improvement in propagating plants from cuttings and the like which comprises treating the same with an aqueous solution of sodium 1,4-dihydronaphthalene-1,4-dicarboxylate.

JOHN FRANK LONTZ.